(12) United States Patent
de Lore et al.

(10) Patent No.: US 8,393,456 B2
(45) Date of Patent: Mar. 12, 2013

(54) MOBILE MACHINE IN MAIN CONVEYOR AND METHOD OF USING SUCH MACHINE

(75) Inventors: Andrew P. de Lore, Green Point (AU); Peter Weatherhead, Bateau Bay (AU)

(73) Assignee: Joy MM Delaware, Inc., Wilmington, DE (US)

( * ) Notice: Subject to any disclaimer, the term of this patent is extended or adjusted under 35 U.S.C. 154(b) by 181 days.

(21) Appl. No.: 12/764,681

(22) Filed: Apr. 21, 2010

(65) Prior Publication Data

US 2010/0276260 A1 Nov. 4, 2010

(30) Foreign Application Priority Data

Apr. 30, 2009 (AU) ................................ 2009201741
Jan. 22, 2010 (AU) ................................ 2010200261

(51) Int. Cl.
*B65G 15/26* (2006.01)
(52) U.S. Cl. ........................................ 198/313; 198/812
(58) Field of Classification Search .................. 198/313, 198/314, 588, 812
See application file for complete search history.

(56) References Cited

U.S. PATENT DOCUMENTS

| | | | | |
|---|---|---|---|---|
| 4,986,412 A | * | 1/1991 | Brais | 198/592 |
| 5,938,004 A | * | 8/1999 | Roberts et al. | 198/812 |
| 5,979,642 A | * | 11/1999 | Hall et al. | 198/812 |
| 6,095,320 A | * | 8/2000 | DeMong et al. | 198/812 |
| 7,658,271 B2 | * | 2/2010 | Fuchs et al. | 198/311 |
| 7,823,715 B2 | * | 11/2010 | Kinnunen et al. | 198/313 |

* cited by examiner

*Primary Examiner* — James R Bidwell
(74) *Attorney, Agent, or Firm* — Michael Best & Friedrich LLP (57) ABSTRACT

A storage platform is incorporated into the main conveyor. The machine is movable, and incorporates space for the storage of main conveyor structure. The machine also includes a mechanism for raising the top of the endless belt, and for permitting the lower or return portion of the endless belt to pass through the mobile machine.

23 Claims, 10 Drawing Sheets

MOBILE MACHINE IN MAIN CONVEYOR AND METHOD OF USING SUCH MACHINE

FIELD OF THE INVENTION

This disclosure relates to a conveyor system for moving mining material from a mining location. Such conveyors typically include an endless belt that moves over a supporting structure. More particularly, this disclosure relates to a method and machine for aiding in reducing the amount of time needed to reduce the length of such a conveyor.

BACKGROUND OF THE INVENTION

In mining, especially in longwall mining, it is common to have a long main gate conveyor that takes the mined material from the mining location and moves it to another conveyor which will then move the mined material to a location outside of the mine, or in the case of a highwall longwall mine, the long main gate conveyer will transport mined material directly to the surface.

Often, long entries are developed, and mining then begins at the end of the long entry. As the mine material is removed from the mine, the mining machinery moves back along the original long entry. Since the main gate conveyor sits in this long entry, the conveyor, which includes an endless belt, reduces its overall length as the minerals are mined. As the conveyor shortens, conveyor structure needs to be removed. Presently, the removal of conveyor structure requires the shutdown of the mining operation for a significant amount of time.

Any reference herein to known prior art does not, unless the contrary indication appears, constitute an admission that such prior art is commonly known by those skilled in the art to which the invention relates, at the priority date of this application.

SUMMARY OF THE INVENTION

This disclosure has as one of its objects to shorten the amount of time needed to shorten the length of the main conveyor during mining operations.

This disclosure teaches a machine incorporated into the main conveyor. The machine is movable, and incorporates space for the storage of main conveyor structure. The machine also includes a mechanism for raising the top of the endless belt, and for permitting the lower or return portion of the endless belt to pass through the mobile machine.

More particularly, the mobile machine is incorporated into the structure of the main conveyor. The mobile machine includes a support frame, and a plurality of belt supports spaced along the support frame. Located between the belt supports is space for the storage of main conveyor structure. The main conveyor structure is stored in one or more pods that can be removed from the side of the mobile machine. Located beneath the support frame is return belt support structure. The return belt passes through the mobile machine. At the end of the support frame, is a means for lifting the top portion of the endless belt. The mobile machine can also include outriggers attached to the support frame for levelling the mobile machine. The belt support structure also includes rollers that support the endless belt.

BRIEF DESCRIPTION OF THE DRAWINGS

An embodiment or embodiments of the present invention will now be described, by way of example only, with reference to the accompanying drawings, in which.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as limiting terms.

DETAILED DESCRIPTION OF THE EMBODIMENT OR EMBODIMENTS

Illustrated in the drawings is a machine 10 incorporated into a main conveyor 12. The machine 10 is movable, and incorporates space for the storage of main conveyor structure 14. The machine 10 also includes a mechanism 44 for raising the top 24 of the conveyor's endless belt 22, and for permitting the lower or return portion 26 of the endless belt 22 to pass through the mobile machine 10. More particularly, the mobile machine 10 has space to allow the return portion 26 of the endless belt to pass beneath the top portion 24 of the endless belt.

More particularly, the mobile machine 10 is incorporated into the structure of the main conveyor 12. The mobile machine 10 includes a storage platform in the form of a support frame 30, and means for supporting the top portion of the endless belt above the support frame in the form of a plurality of belt supports 34 spaced along the support frame 30. Located between the belt supports 34 is space for the storage of main conveyor structure 14. The main conveyor structure 14 is stored in pods 36 that can be removed from the side of the mobile machine 10.

Located beneath the support frame 30 is means for supporting the bottom portion of the endless belt 22 in the form of a return belt support structure which includes a series of rollers 40 (see also in FIG. 5), spaced along the lower portion of the support structure 30. The return portion 26 passes through the mobile machine 10. At the end of the support frame 30, is a mechanism 44 for lifting the top portion 24 of the endless belt. The mobile machine 10 also includes outriggers not illustrated attached to the support frame 30 for levelling the mobile machine 10. The belt supports 34 also include rollers 52 that support the endless belt 22.

More particularly, the mechanism 44 for raising the top portion of the belt includes a roller 56 having two ends. At one end, is a post 60, and at the other end, is a similar post 62. Each post is telescoping, mounted on the support frame 30, and can be extended. When extended, the top portion 24 of the belt is raised to permit removal of the main conveyor structure 14.

In addition, the mobile machine 10 includes a ramp 66 connected to the support frame 30 for aiding the movement of main conveyor support structure 14 onto the mobile machine 10 and into the storage pods 36. The ramp is formed from two rails 68, a respective one of each extending down and forward at an angle from a respective one of a post 69 attached to the forward end of the support frame 30. As the mobile machine 10 advances, the main conveyor structure 14 slides up along the ramp 66 and into the mobile machine 10, where it is then pushed rearward to the storage pods 36. The main conveyor structures 14 includes a frame 14.1 to which is mounted two detachable legs 70, carry rolls 74 and detachable return rolls 74.1 supported by frame 14.1 between the two legs 70. The return rolls 74.1 and legs 70 are detached from frame 14.1 when the main conveyor structure 14 is stored on the machine 10, with the legs 70 being stored separate from the return rolls 74.1.

As an alternative, the legs 70 instead of being detachable can be of a telescoping construction, whereby they remain fixed to the frame 14.1 but are retracted then stored with the frame 14.1 on the machine 10. The legs 70, if of a telescoping construction will mean that the length of the leg 70 can be readily shortened for storage, and thus requires less assembly/disassembly and carrying to deploy or store the frame 14.1. In the following passages relating to deployment and storage of the frame 14.1, reference will be made to the legs 70 being of a detachable construction so as to be separable from the frame 14.1.

Figure 1:
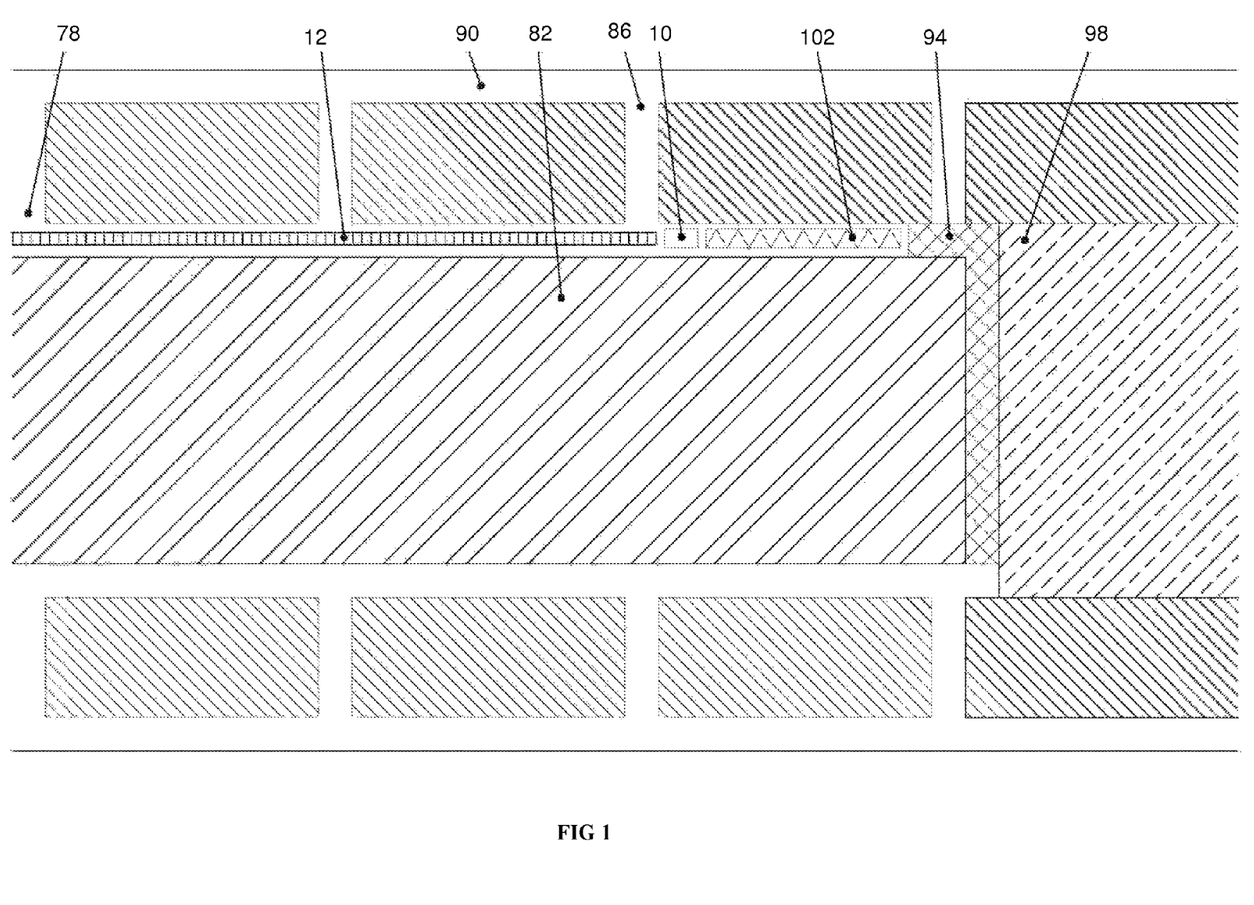
FIG. 1 is a top view of a typical mine.

FIG. 1 is a top view of a typical mine. The view shows the entries 78 that have been cut along a longwall block 82, which contains the coal to be mined, and crosscuts 86 which permit access to the main entries 78 from other passageways 90 cut through the mine. The longwall 94 is situated at one end of the longwall block 82, as shown schematically in FIG. 1. As the longwall 94 advances through the longwall block 82, the goaf area 98 (where the mine roof has fallen) increases while the longwall block 82 decreases in overall size, as shown by a comparison of FIG. 2 with FIG. 1.

Figure 2:
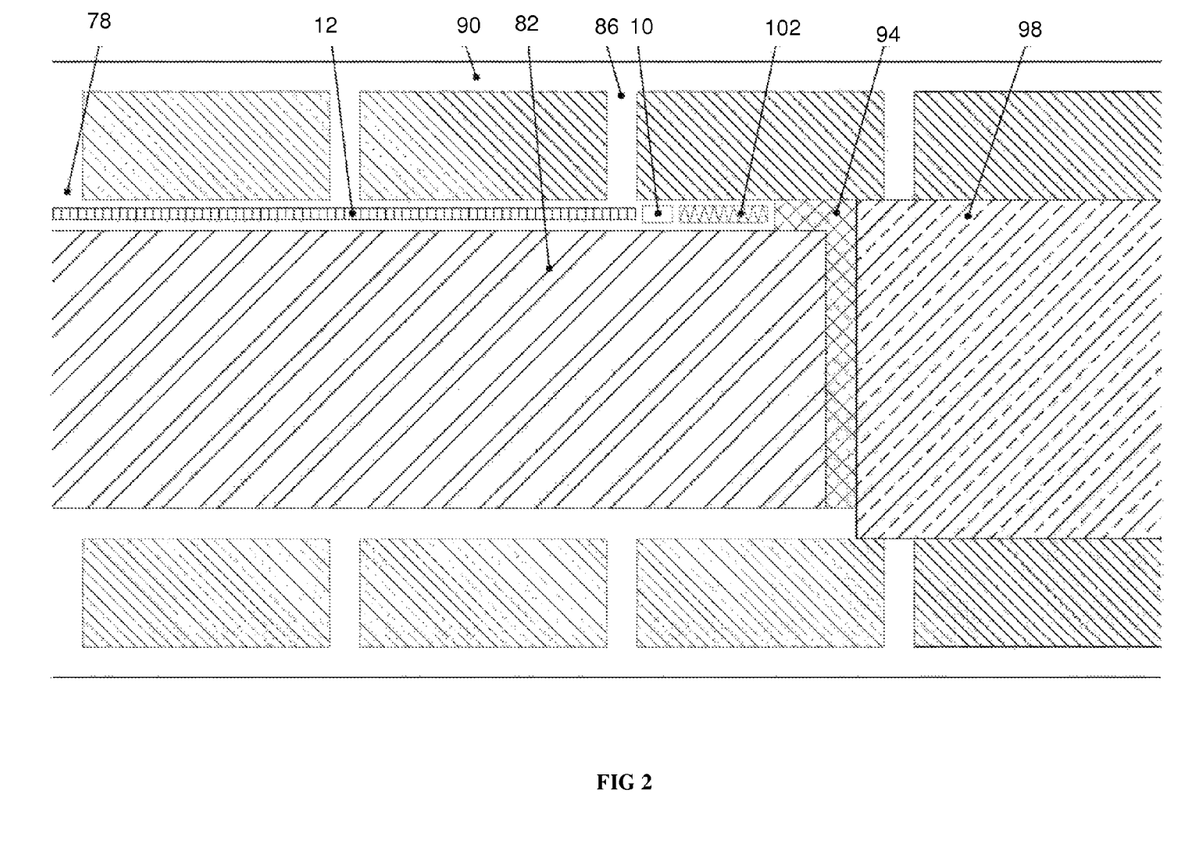
FIG. 2 is a top view similar to FIG. 1 with the longwall advanced into the longwall block.

As the longwall 94 advances through the longwall block 82, the longwall 94 dumps its mined material onto the main conveyor 12. In the schematic illustration of FIG. 1, the mined material is dumped onto a collapsible conveyor 102, which is a conveyer having a collapsible support structure. The collapsible conveyor 102 is a conveyor that serves as a portion of the main conveyor 12. Its advantage is that it can be reduced in its overall length as the long wall block size decreases, as shown in FIG. 2.

Figure 3:
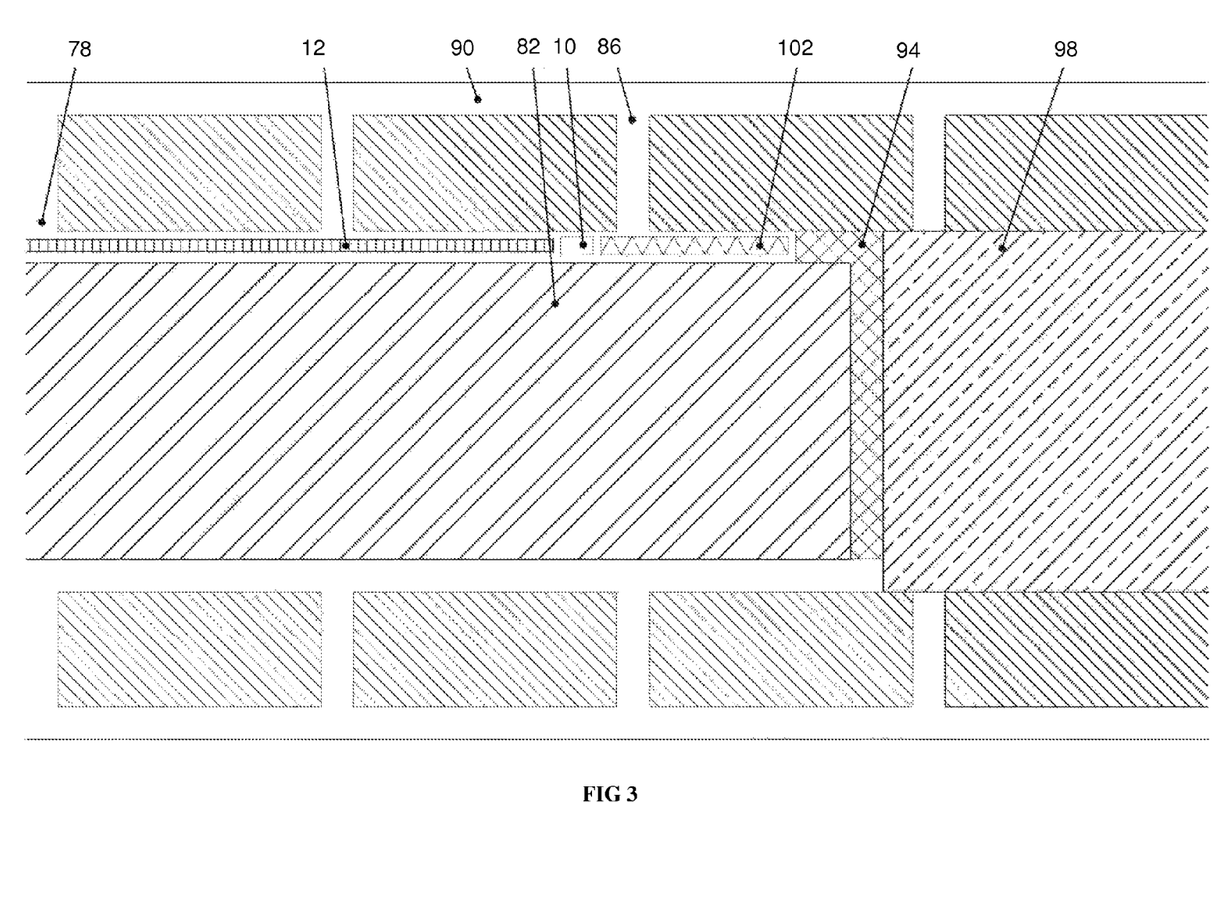
FIG. 3 is a top view similar to FIG. 2 illustrating the extension of the collapsible conveyor and advancement of the mobile machine.

But eventually the collapsible conveyor 102 becomes fully compressed. The mining operation is then stopped, while part of the main conveyor 12 is removed. The mobile machine 10 of this disclosure helps in the rapid removal of this portion of the main conveyor 12. As shown in FIG. 3, when the main conveyor 12 is no longer adjacent to a crosscut 86, the mobile machine 10 provides a main conveyor structure storage area. By providing such a storage area, the amount of time needed to remove main conveyor structure 14 is reduced. Previously, the main conveyor structure 14 needed to be man-handled to the next crosscut 86. As the longwall block size is reduced, and the mobile machine 10 moves to the next crosscut 86, the mobile machine 10 takes up main conveyor structure 14. Then, when the mobile machine 10 reaches the crosscut 86, the main conveyor structure storage pods 36 can be removed from the mobile machine 10, and replaced with empty storage pods 36.

Figure 4:
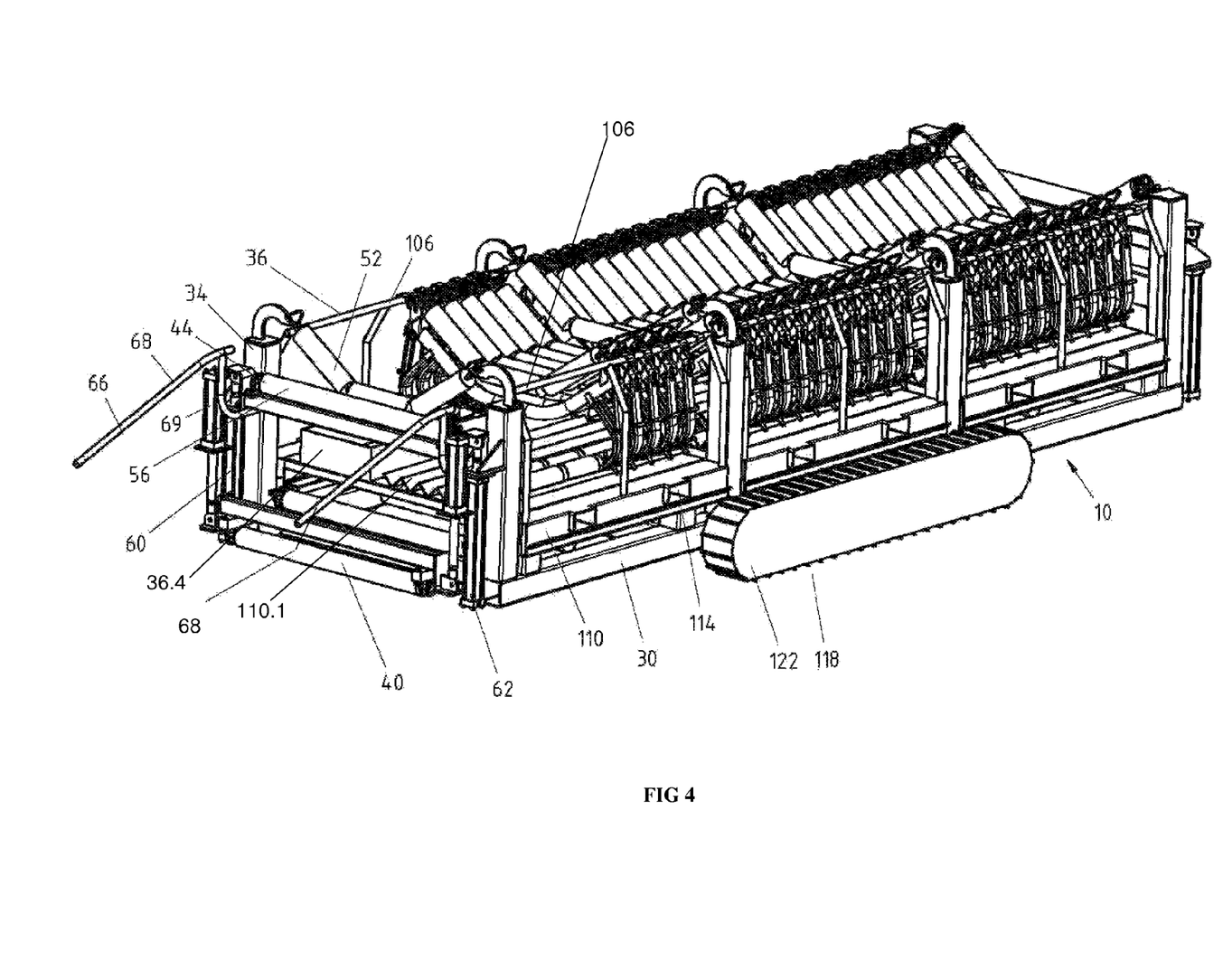
FIG. 4 is a perspective view of a mobile machine.

FIG. 4 is a perspective view of the mobile machine 10. The mobile machine 10 includes the support frame 30, and the plurality of spaced apart belt supports 34 that support the rollers 52 that in turn support the top 24 of the conveyor endless belt. Extending between the spaces between belt supports 34 are runners 106. The runners 106 provide storage for the frame 14.1 and the carry rolls 74 of the main conveyor structure 14, which are suspended between opposed runners 106 on the sides of the pod 36 as seen in FIG. 4. The runners 106 form part of the removable storage pods 36. Each removable storage pod 36 includes a floor 110 having hollow tubes 114 to receive lifting tynes of a forklift. The floor 110 also includes adjacent cavities 111, which together with an open storage box 36.4 can receive the main conveyor structures support legs 70, while the cavities 111 or the zigzag portion 110.1 of floor 110 can receive the return rolls 74.1 disassembled from the main conveyor structure 14. Extending upward from the storage pod floor 110 are inwardly angled supports for the runners 106 that support the main conveyor structure frame 14.1 and attached carry rolls 74.

Mounted beneath the support frame 30 is a mechanism 118 for moving the mobile machine 10. The mechanism 118 for moving the mobile machine includes a electric motor (not shown) which drives endless tracks 122 mounted on each side of the support frame 30. In other embodiments, not shown, other means for moving the mobile machine 10 can be used.

Figure 5:
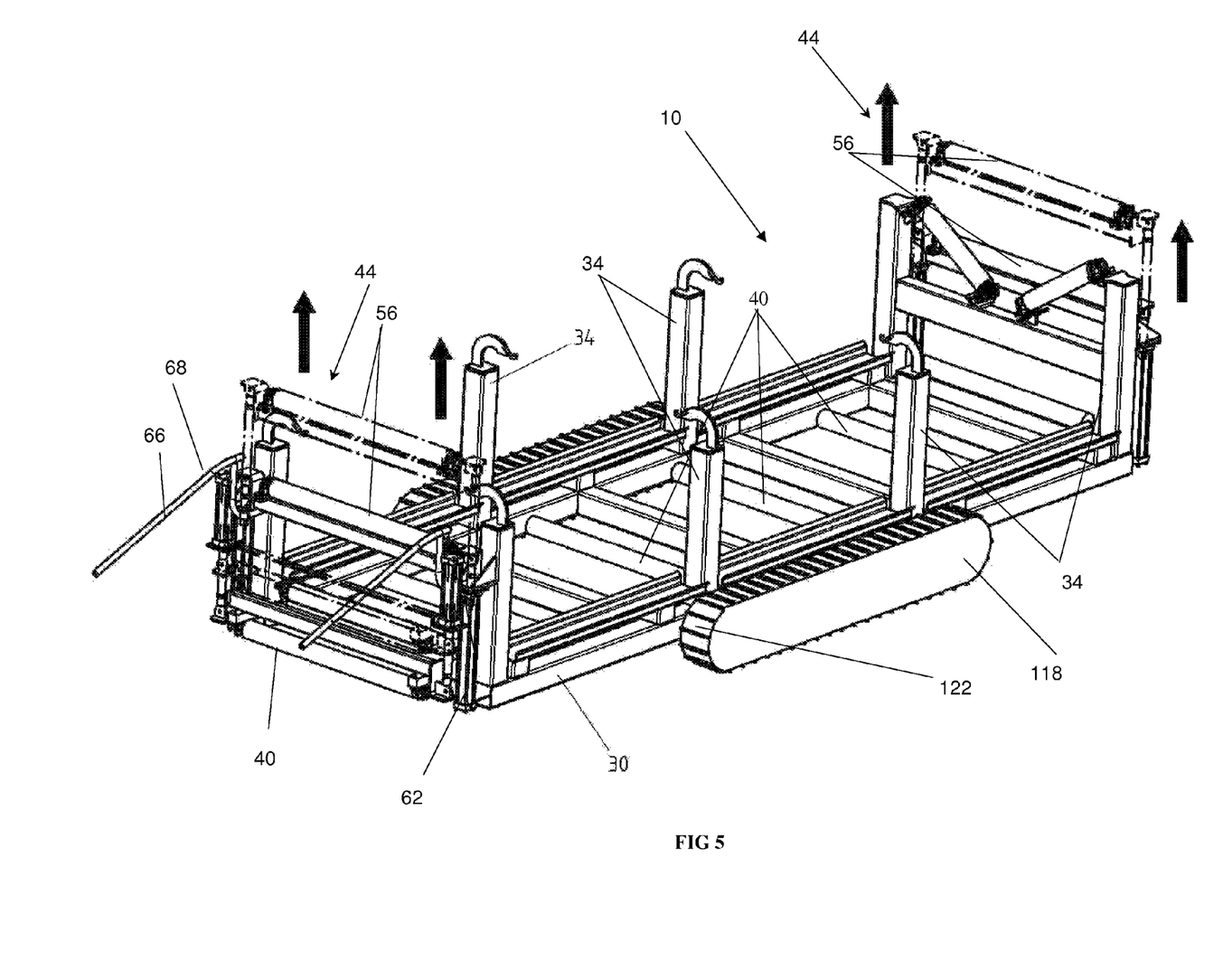
FIG. 5 is a perspective view of the mobile machine in FIG. 4, with storage pods removed, and with a mechanism for lifting the top portion of an endless belt shown in its extended position.

FIG. 5 is a perspective view of the mobile machine 10 in FIG. 4, with the storage pods 36 removed, and with the mechanism 44 for lifting the top portion 24 of the endless belt shown in its extended position.

Figure 6:
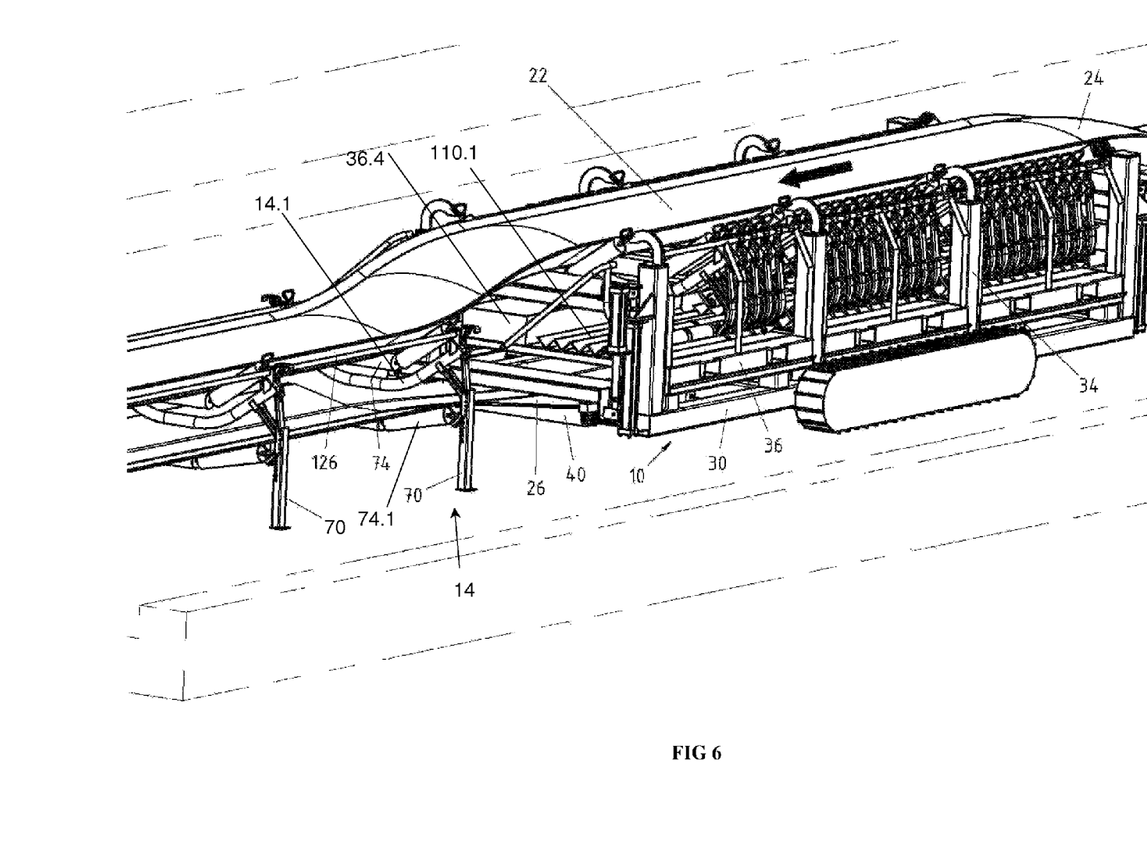
FIG. 6 is a perspective view of the mobile machine positioned within a main conveyor.
Figure 7:
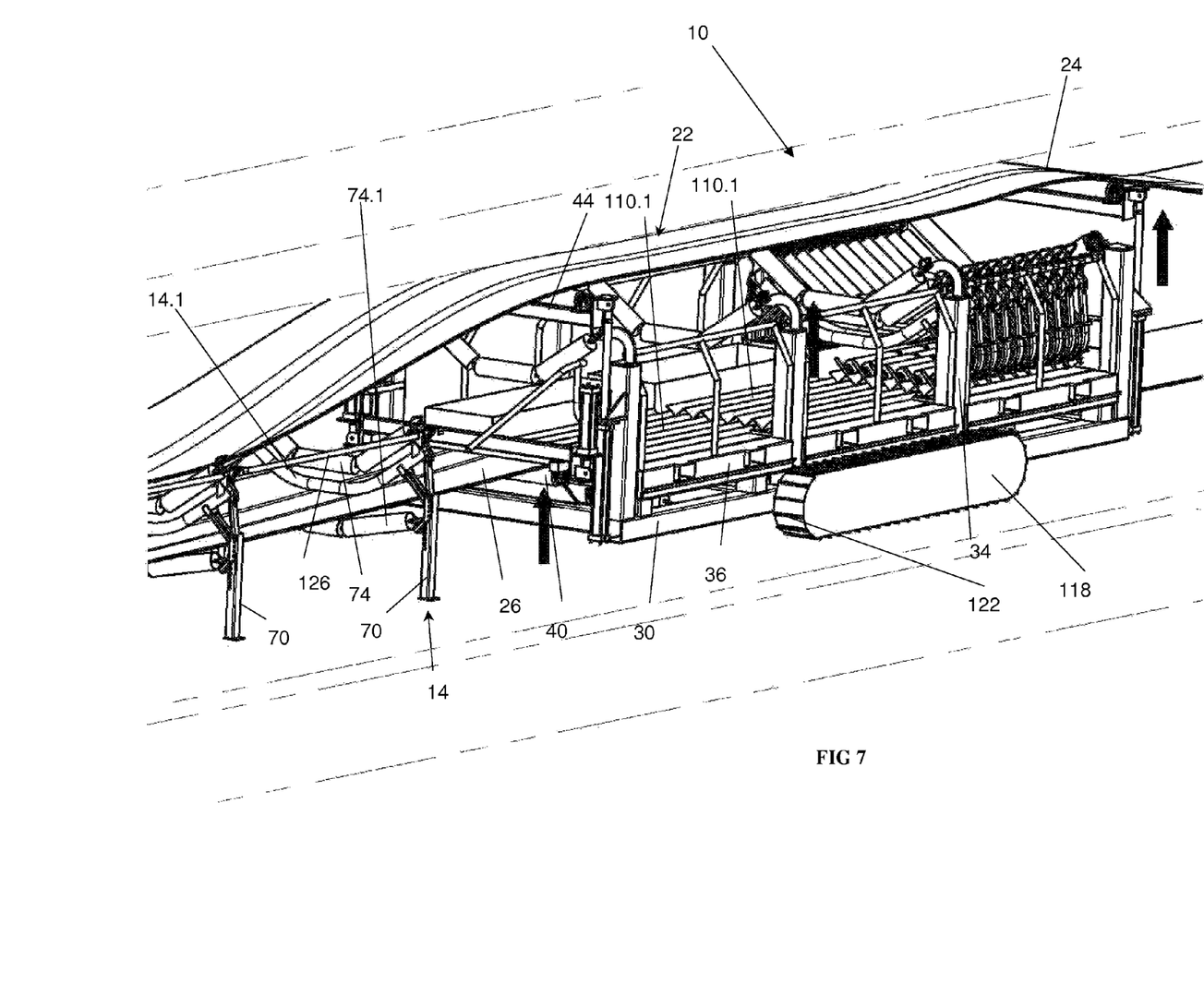
FIG. 7 is a perspective view of the mobile machine of FIG. 6 with the top belt raised.
Figure 8:
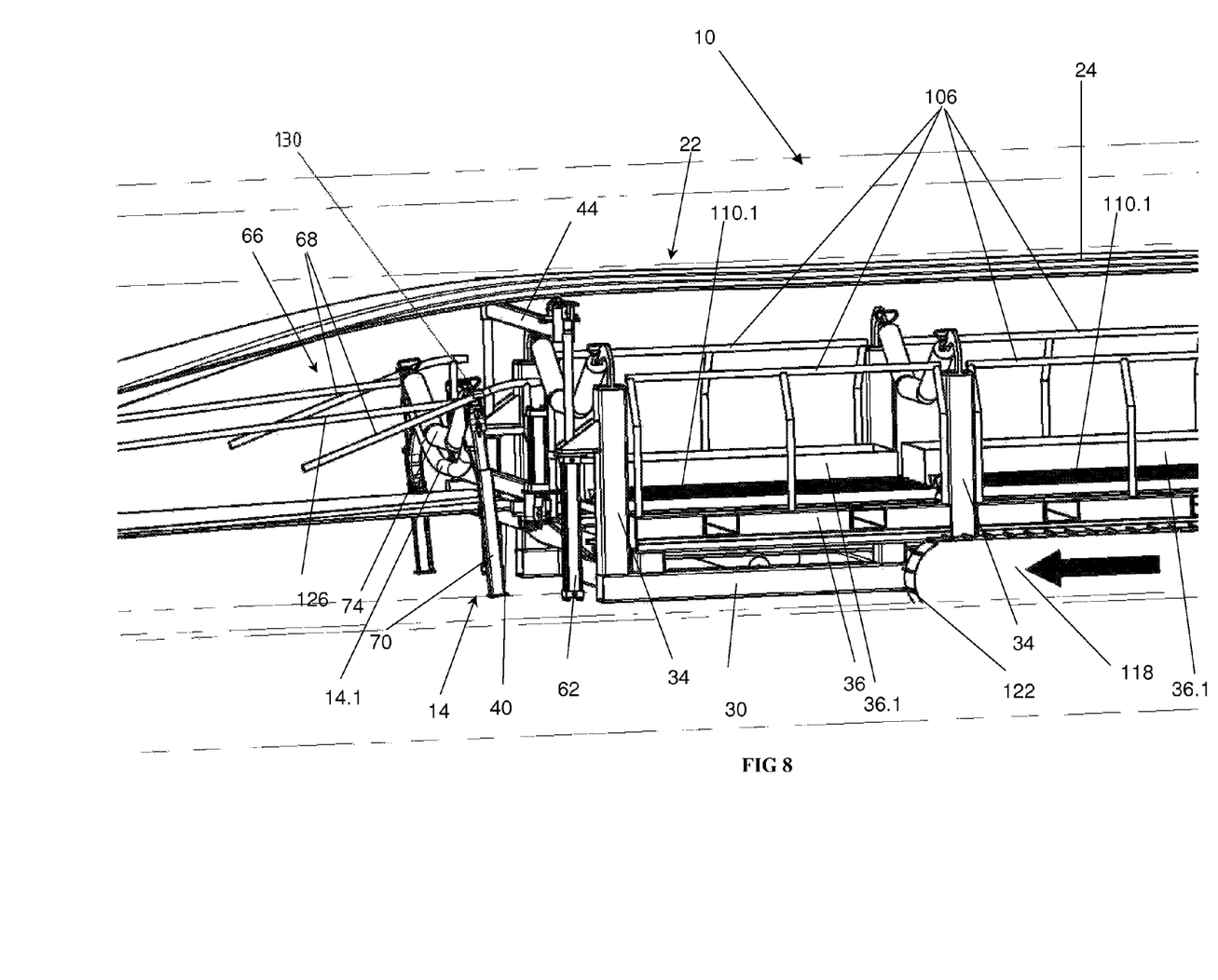
FIG. 8 is a perspective view of the mobile machine of FIG. 6 with the mobile machine driven forward and the main conveyor structure on a ramp.

The operation of the mobile machine 10 is further illustrated in FIGS. 6 through 10. In FIG. 6, the mobile machine 10 is shown positioned within the main conveyor 12. To the right, as shown in FIG. 6, would be the collapsible conveyor (not shown). To the left, as shown in FIG. 6, is the main conveyor 12. The main conveyor 12 includes the spaced apart conveyer structures 14 each having a frame 14.1 to which is mounted, belt-supporting carry rolls 74 and return rolls 74.1 with legs 70 connected to the sides of frame 14.1. Extending between adjacent main conveyor support structures 14 are a spacing bars or stringers 126. Prior to beginning to place a main conveyor structure 14 onto the mobile machine 10, the mined material or burden is run off of the belt 22 located above the mobile machine 10 and above the main conveyor structure 14 to be placed on the mobile machine 10. After this runoff of the mined material, the main conveyor 12 is stopped.

The top portion 24 of the belt is then lifted via the lifting mechanism 44 present at each end of the mobile machine 10. When the machine 10 is in the vicinity of cross cuts 86 (see FIGS. 1 to 3) and a full storage pod 36 is aligned with a cross cut, then that full storage pod 36 can be removed, and replaced with an empty storage pod 36. If a full storage pod 36 were not aligned with a cross cut 86 then the machine 10 would continue to fill empty or partially filled storage pods 36.

Figure 9:
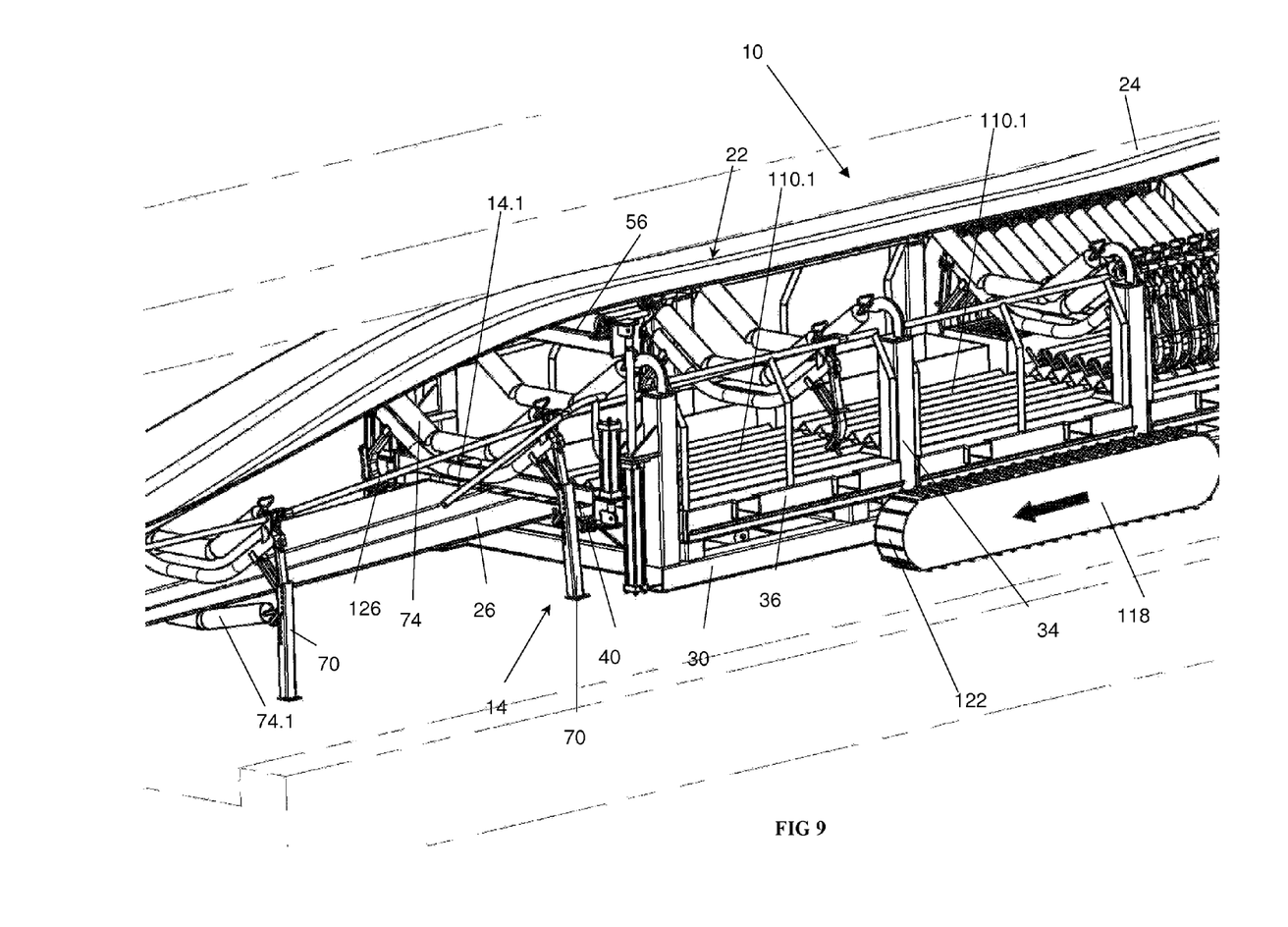
FIG. 9 is a perspective view of the mobile machine of FIG. 6 with the mobile machine continuing to be driven forward with the main conveyor structure on the mobile machine.
Figure 10:
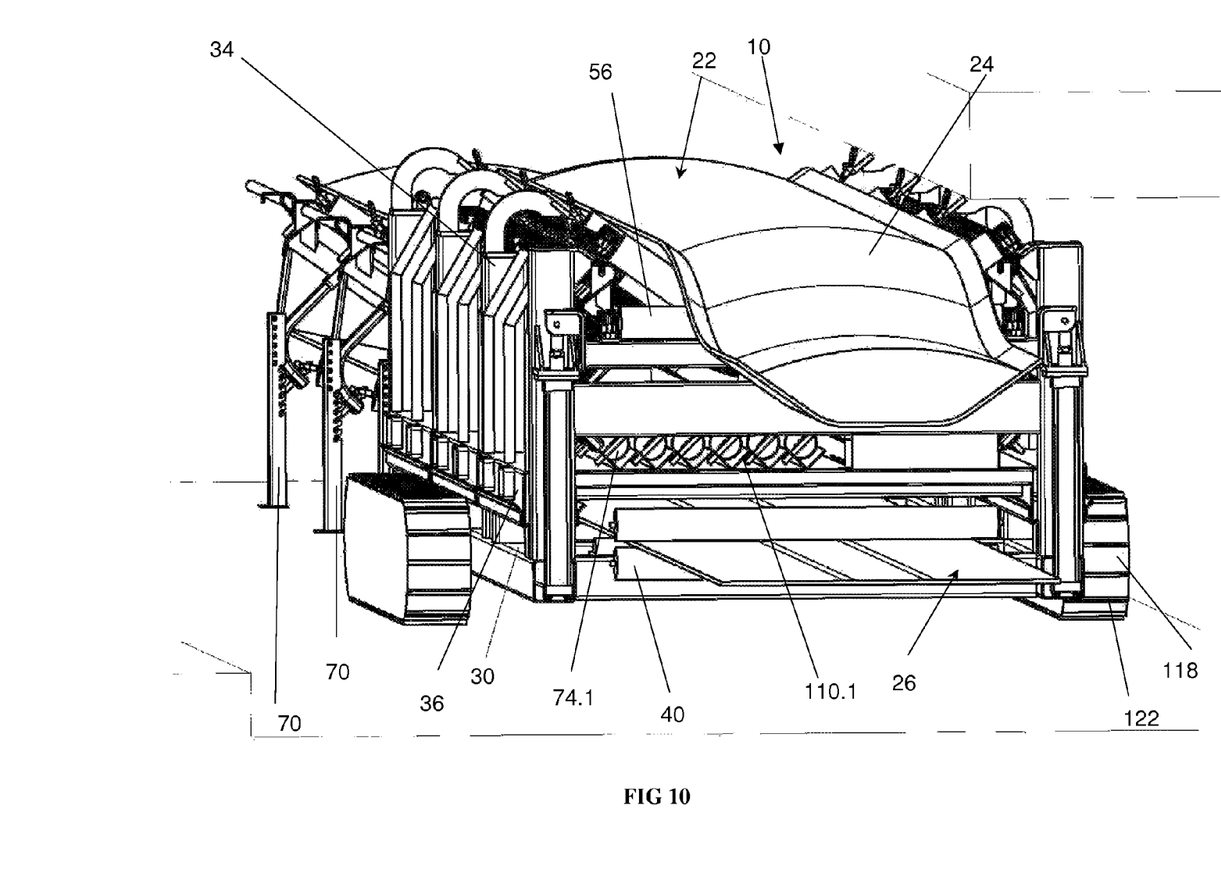
FIG. 10 is a perspective view of the mobile machine of FIG. 6, back in operation.

The mobile machine 10 is then moved forward, and the ramp 66 engages lifting brackets 130 on the upper outside portions of the frame 14.1. As the mobile machine 10 moves forward, the ramp 66 raises the frame 14.1 by the brackets 130, permitting the removal of the support legs 70 and the return rolls 74.1 allowing both to be stored in respectively the open storage box 36.4 and on the zig zag floor 110.1 or other locations if desired. As illustrated in FIG. 9, once the frames 14.1 with mounted carry rolls 74 are stored on the runner 106 of storage pods 36, the mobile machine 10 is then aligned and levelled by the outriggers (not illustrated), and the top portion 22 of the main conveyor belt is lowered and returned to its operating position.

FIG. 5 shows the support frame 30 with all storage pods 36 having been removed from the mobile machine 10.

Various other features of this disclosure are set forth in the following claims.

It will be understood that the invention disclosed and defined herein extends to all alternative combinations of two or more of the individual features mentioned or evident from the text. All of these different combinations constitute various alternative aspects of the invention.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The invention claimed is:

1. A storage platform for a conveyor including an endless belt and a support structure, the storage platform comprising:
   a support frame for receiving the conveyor support structure;
   an upper support for supporting a top portion of the endless belt above the support frame;
   a lower support for supporting a return portion of the endless belt;
   a drive system for moving the storage platform; and
   a guide rail engaging the conveyor support structure to facilitate movement of the conveyor support structure onto the storage platform as the storage platform advances.

2. The storage platform of claim 1, wherein the drive system includes a pair of endless tracks driven by a motor.

3. The storage platform of claim 1, wherein the support frame receives at least one storage pod for storing the conveyor support structure, the storage pod being removably supported on the support frame.

4. The storage platform of claim 3, wherein the storage pod includes a pod rail for receiving and supporting the conveyor support structure while the support structure is stored on the pod.

5. The storage platform of claim 1, wherein the upper support includes a plurality of belt supports spaced apart along a length of the storage platform, each belt support including a pair of support posts and a roller coupled between the support posts.

6. The storage platform of claim 1, wherein the lower support includes a plurality of rollers.

7. The storage platform of claim 1, further comprising at least one extendable post for raising the top portion of the endless belt relative to the return portion.

8. The storage platform of claim 1, wherein the guide rail includes a ramp, such that the advance of the storage platform moves the ramp under a portion of the conveyor support structure and causes the conveyor support structure to slide along the ramp and onto the storage platform.

9. A storage platform adapted to be used with a conveyor including an endless belt and a support structure, the storage platform comprising:
   a support frame for receiving the conveyor support structure;
   a first support for supporting a top portion of the endless belt above the support frame;
   a second support for supporting a return portion of the endless belt; and
   a drive system for moving the storage platform.

10. The storage platform of claim 9, wherein the support frame receives at least one storage pod for storing the conveyor support structure, the storage pod being removably supported on the support frame.

11. The storage platform of claim 10, wherein the storage pod includes a pod rail for receiving and supporting the conveyor support structure while the support structure is stored on the pod.

12. The storage platform of claim 11, further comprising an inclined guide rail coupled to the support frame, wherein movement of the storage platform causes the guide rail to engage the conveyor support structure such that the conveyor support structure slides along the guide rail and moves onto the pod rail.

13. The storage platform of claim 9, wherein the first support includes a plurality of belt supports spaced apart along a length of the storage platform, each belt support including a pair of support posts and a roller coupled between the support posts.

14. The storage platform of claim 9, wherein the second support includes a plurality of rollers.

15. The storage platform of claim 9, wherein the drive system includes a pair of endless tracks driven by a motor.

16. The storage platform of claim 9, further comprising at least one extendable post for raising the top portion of the endless belt above the support frame and away from the return portion of the endless belt.

17. A method of reducing a length of a conveyor, the conveyor including a support structure and a storage platform for receiving the support structure, the method comprising:
   raising a top portion of an endless belt;
   advancing the storage platform; and
   engaging the conveyor support structure with a guide rail to move the conveyor support structure onto the storage platform.

18. The method of claim 17, wherein raising the top portion of the endless belt includes extending a first support member to raise the top portion relative to the return portion.

19. The method of claim 17, further comprising placing a storage pod between the top portion of the endless belt and the return portion of the endless belt.

20. The method of claim 17, wherein engaging the conveyor support structure includes moving the conveyor support structure onto at least one storage pod that is removably coupled to the support platform.

21. The method of claim 20, further comprising removing the storage pod from the storage platform.

22. The method of claim 17, wherein advancing the storage platform includes actuating a drive system positioned on the storage platform.

23. The method of claim 17, further comprising removing a lower belt support from the conveyor support structure, and wherein receiving the conveyor support structure includes engaging the conveyor support structure with a guide rail to slidably move the conveyor support structure onto the storage platform.

* * * * *